United States Patent
Wang et al.

(10) Patent No.: US 12,425,936 B2
(45) Date of Patent: Sep. 23, 2025

(54) METHODS AND DEVICES FOR ENHANCING MOBILITY ROBUSTNESS TO INTEGRATED ACCESS AND BACKHAUL FOR NEW RADIO

(71) Applicant: ZTE Corporation, Shenzhen (CN)

(72) Inventors: Liping Wang, Shenzhen (CN); Ying Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 411 days.

(21) Appl. No.: 18/103,777

(22) Filed: Jan. 31, 2023

(65) Prior Publication Data

US 2023/0199580 A1 Jun. 22, 2023

Related U.S. Application Data

(63) Continuation of application No. PCT/CN2020/106139, filed on Jul. 31, 2020.

(51) Int. Cl.
*H04W 36/00* (2009.01)
*H04W 36/18* (2009.01)

(52) U.S. Cl.
CPC ..... *H04W 36/0069* (2018.08); *H04W 36/185* (2023.05)

(58) Field of Classification Search
None
See application file for complete search history.

(56) References Cited

U.S. PATENT DOCUMENTS

2020/0107383 A1   4/2020 Novlan et al.
2020/0314717 A1*  10/2020 Kim ................ H04W 36/185
(Continued)

FOREIGN PATENT DOCUMENTS

CN    1992957 A    7/2007
CN  110662297 A    1/2020
(Continued)

OTHER PUBLICATIONS

Extended European Search Report regarding EP 20 94 6725 dated Jul. 31, 2023, 15 pages.
(Continued)

*Primary Examiner* — Robert M Morlan
(74) *Attorney, Agent, or Firm* — Crowell & Moring LLP

(57) ABSTRACT

The present disclosure describes methods, systems, and devices for enhancing mobility robustness to integrated access and backhaul (IAB) for new radio (NR). One method includes enhancing mobility robustness of a migrating integrated access and backhaul-node (IAB-node) for NR during migration from a source IAB-donor-central unit (CU) to a target IAB-donor-CU by sending, by the source IAB-donor-CU, a handover request message to the target IAB-donor-CU, the handover request message comprising a dual active protocol stack (DAPS) request information. Another method includes enhancing mobility robustness of a migrating IAB-node for NR during migration from a source parent IAB-node to a target parent IAB-node by sending, by an IAB-donor-CU, a F1AP message to the migrating IAB-node, the F1AP message comprising a radio resource control reconfiguration (RRCReconfiguration) message comprising a DAPS configuration information.

18 Claims, 11 Drawing Sheets

(56) References Cited

U.S. PATENT DOCUMENTS

| | | | |
|---|---|---|---|
| 2020/0351854 A1* | 11/2020 | Wang | H04W 76/12 |
| 2021/0385714 A1* | 12/2021 | Paladugu | H04W 36/0009 |
| 2023/0199578 A1* | 6/2023 | Wu | H04W 36/362 370/331 |

FOREIGN PATENT DOCUMENTS

| | | |
|---|---|---|
| CN | 111386728 A | 7/2020 |
| WO | WO 2019/246446 A1 | 12/2019 |
| WO | WO 2020017941 A1 | 1/2020 |
| WO | WO2020067736 A1 | 4/2020 |
| WO | WO 2020/088592 A1 | 5/2020 |

OTHER PUBLICATIONS

"5G; NG-RAN; FI Application Protocol (FIAP) (3GPP TS 38.473 version 16.2.0 Release 16)," ETSI Technical Specification, European Telecommunications Standards Institute (ETSI), 650, Route Des Lucioles, F-06921 Sophia-Antipolis, France, vol. 3GPP RAN, No. V16.2.0, Jul. 21, 2020, pp. 1-366, Retrieved from the Internet: http://www.etsi.org/deliver/etsi_ts/138400_138499/138473/16.02.00_60/ts_138473v160200p.pdf.

"3rd Generation Partnership Project; Technical Specification Group Radio Access Network; NR; Backhaul Adaptation Protocol (BAP) specification (Release 16)," 3GPP TS Draft, 38.340 V16.1.0, 3rd Generation Partnership Project (3GPP), Mobile Competence Centre, 650, Route Des Lucioles, F 06921 Sophia-Antipolis Cedex, France, Jul. 24, 2020, XP052300345, Retrieved from the Internet: https://ftp.3gpp.org/3guinternal/3GPP_ultimate_versions_to_be_transposed/sentToDpc/38340-gl0.zip 38340-gl0.docx.

International Search Report and Written Opinion regarding PCT/CN2020/106139 dated May 8, 2021.

LG Electronics. "(TP for NR_IAB BL CR for TS 38.401): IAB-node migration between different IAB-donors," 3GPP TSG-RAN WG3 #106 R3-197009, Nov. 22, 2019.

Chinese Office Action with English translation regarding 2020801046504 dated Jul. 29, 2024, 19 pages.

* cited by examiner

400 sending, by the source IAB-donor-CU, a handover request message to the target IAB-donor-CU, the handover request message comprising dual active protocol stack (DAPS) request information

500 sending, by a central unit (CU) of an IAB-donor (IAB-donor-CU), a F1AP message to the migrating IAB-node, the F1AP message comprising a radio resource control re-configuration (RRCReconfiguration) message comprising dual active protocol stack (DAPS) configuration information

METHODS AND DEVICES FOR ENHANCING MOBILITY ROBUSTNESS TO INTEGRATED ACCESS AND BACKHAUL FOR NEW RADIO

CROSS-REFERENCE TO RELATED APPLICATION

This application is a continuation application of PCT International Patent Application No. PCT/CN2020/106139, filed with the China National Intellectual Property Administration, PRC on Jul. 31, 2020, which is herein incorporated by reference in its entirety.

TECHNICAL FIELD

The present disclosure is directed generally to wireless communications. Particularly, the present disclosure relates to methods and devices for enhancing mobility robustness to integrated access and backhaul (IAB) for new radio (NR).

BACKGROUND

Wireless communication technologies are moving the world toward an increasingly connected and networked society. Compared with long term evolution (LTE), the fifth generation (5G) new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency.

The 5G NR may include an integrated access backhaul (IAB) implementation. The IAB implementation may include one or more IAB-donors and multiple connecting IAB-nodes. Currently, there are problems and/or issues associated with improving the mobility robustness for migrating IAB nodes.

The present disclosure may address at least some of problems/issues associated with the existing system to improve the performance of the wireless communication.

SUMMARY

This document relates to methods, systems, and devices for wireless communication, and more specifically, for enhancing mobility robustness to integrated access and backhaul (IAB) for new radio (NR).

In one embodiment, the present disclosure describes a method for wireless communication. The method includes enhancing mobility robustness of a migrating integrated access and backhaul-node (IAB-node) for new radio (NR) during migration from a source IAB-donor-central unit (CU) to a target IAB-donor-CU by sending, by the source IAB-donor-CU, a handover request message to the target IAB-donor-CU, the handover request message comprising dual active protocol stack (DAPS) Request Information.

In another embodiment, the present disclosure describes a method for wireless communication. The method includes enhancing mobility robustness of a migrating integrated access and backhaul-node (IAB-node) for new radio (NR) during migration from a source parent IAB-node to a target parent IAB-node by sending, by a central unit (CU) of an IAB-donor (IAB-donor-CU), a F1AP message to the migrating IAB-node, the F1AP message comprising a radio resource control re-configuration (RRCReconfiguration) message comprising dual active protocol stack (DAPS) configuration information.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of a method for wireless communication.

DETAILED DESCRIPTION

Figure 1A:
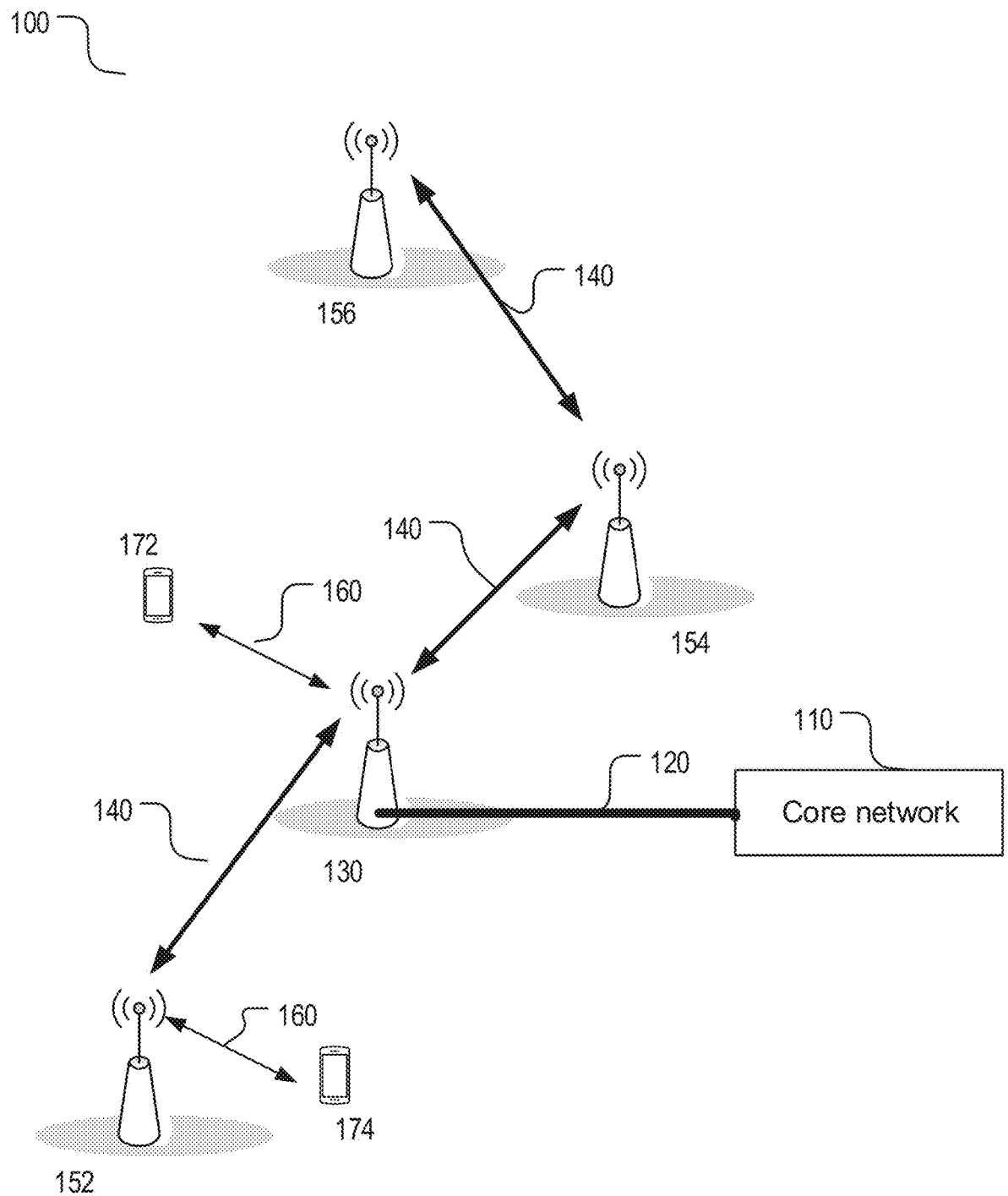
FIG. 1A shows an example of a wireless communication system include an integrated access backhaul (IAB) system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for enhancing mobility robustness to integrated access and backhaul (IAB) for new radio (NR).

Next generation (NG), or 5th generation (5G), wireless communication may provide a range of capabilities from downloading with fast speeds to support real-time low-latency communication. Compared with long-term evolution (LTE), the 5G new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency. The 5G NR may include a development of an integrated access backhaul (IAB) implementation. The IAB implementation may include one or more IAB-donors and multiple connecting IAB-nodes. The IAB implementation may communicate between one or more IAB-donors and one or more IAB-nodes via wireless backhaul and relay links. The IAB implementation may provide a flexible NR cell configuration and increase cell density without increasing the density of IAB-donors.

An IAB system may include one or more IAB-donors and one or more IAB-nodes, which collectively provide wireless connection service to one or more user equipment (UEs) (e.g., smartphones). The IAB-donors and IAB-nodes may be wireless network base stations including a NG radio access network (NG-RAN) base station, which may include a nodeB (NB, e.g., a gNB) in a mobile telecommunications context. The IAB-donor may provide access backhaul to one or more connecting child IAB-nodes, and may connect to a core network via a wired communication. In one implementation, the core network may include a 5G core network (5GC). In another implementation, the wired communication may include a fiber transport communication. The IAB-node may include wireless access link and wireless backhaul link. The wireless access link may be used for communication between a UE and the IAB-node. The wireless backhaul link may be used for communication between the IAB-node and the IAB-donor, and/or communications between one IAB-node with another IAB-node. Thus, the IAB-node does not need a wired communication network for data backhaul. In some implementations, the IAB-node does not include a wired communication network for data backhaul, so that IAB-node are more flexible and easier to implement, mitigating the burden of implementing wired communication network. The access link and backhaul link may use transmission bands with same frequency (known as in-band relay), or use transmission bands with different frequency (known as out-band relay).

Figure 1B:
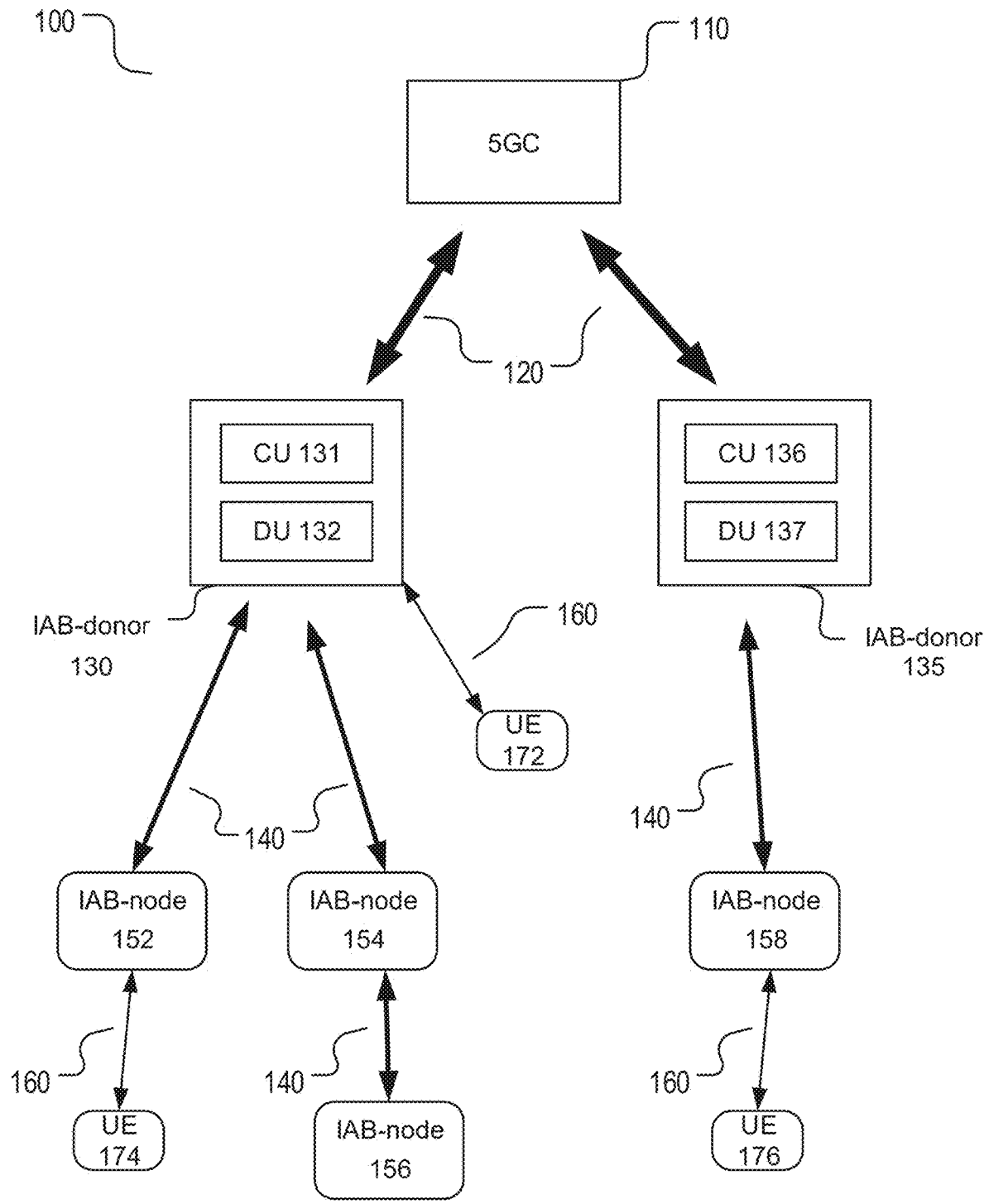
FIG. 1B shows another example of an architecture of an IAB system.

Referring to FIGS. 1A and 1B, the IAB-donor 130 may provide access backhaul 140 to one or more connecting child IAB-nodes (152 and 154). The IAB-donor 130 may connect to a core network 110 via a wired communication 120. In one implementation, the core network 110 may include a 5G core network (5GC). In another implementation, the wired communication 120 may include a fiber transport communication. In another implementation, between the two connecting IAB-nodes (e.g., 154 and 156), the IAB-node 154 may be known as a parent IAB-node, and/or the IAB-node 156 may be known as a child IAB-node.

An IAB-donor may provide a wireless connection to one or more user equipment (UE). The UE may be a mobile device, for example, a smart phone or a mobile communication module disposed in a vehicle. For example, the IAB-donor 130 may provide a wireless connection 160 to a UE 172.

Similarly and without limitation, a child or parent IAB-node may provide a wireless connection to one or more UEs. For example, the IAB-node 152 may provide a wireless connection 160 to a UE 174.

Similarly and without limitation, a child IAB-node may provide access backhaul to one or more connecting grand-child IAB-nodes. For example, the IAB-node 154 may provide access backhaul 140 to an IAB-node 156. Similarly and without limitation, the grandchild IAB-nodes may also provide access backhaul to one or more connecting great-grandchild IAB-nodes and/or provide wireless connection to one or more UEs. In another implementation, the IAB-node 154 may be a parent IAB-node of the IAB-node 156.

Referring to FIG. 1B, the IAB system 100 may include more than one IAB-donors (130 and 135). Each of the IAB-donors may connect to a core network (e.g., 5GC) 110 via a wired communication 120. In one implementation, the IAB-donor 135 may provide access backhaul 140 to one or more connecting child IAB-nodes 158; and the IAB-node 158 may provide a wireless connection 160 to one or more UE 176.

In another implementation, the IAB-donor 130 may include at least one central unit (CU) (for example, an IAB-donor-CU 131) and at least one distributed unit (DU) (for example, an IAB-donor-DU 132). The at least one IAB-donor-DU 132 may connect to the at least one IAB-donor-CU 131, and then the at least one IAB-donor-CU 131 may connect to the 5GC 110.

Similarly in another implementation, the IAB-donor 135 may include at least one CU (for example, an IAB-donor-CU 136) and at least one DU (for example, an IAB-donor-DU 137). The at least one IAB-donor-DU 137 may connect to the at least one IAB-donor-CU 136, and then the at least one IAB-donor-CU 136 may connect to the 5GC 110.

The IAB-node 156, which currently connects to the IAB-donor 130 via the IAB-node 154, may migrate to the IAB-donor 135. This may be called as an inter-donor migration and the IAB-node 156 may be called as a migrating IAB-node. Currently, there are problems and/or issues associated with configuring the migrating IAB node during inter-donor migration.

The present disclosure describes embodiments of methods and devices of enhancing mobility robustness to IAB for NR. To improve the efficiency of wireless communication, the topology and flexibility of the architecture has been greatly improved. Specifically, the existing and/or improved architecture may support inter-CU migration of IAB nodes and multipath transmission of IAB nodes. This complex and flexible architecture may bring advantages to IAB network performance, and may need higher requirements for network control. The present disclosure may address one or more problems associated IAB migration, for example, how to ensure seamless transmission during the IAB migration.

The present disclosure describes methods for maintaining transmission during IAB migration with a principle of a dual active protocol stack (DAPS). The principle of DAPS handover (DAPS-HO) may allow a migrating IAB-node maintaining the connection to a source parent IAB-node cell to remain active for transmission of user data, until the migrating IAB-node is able to transmit user data with a target parent IAB-node. The migrating IAB-node may simultaneously receive DL data with the source parent IAB-node and the target parent IAB-node for a short period during the IAB migration procedure.

Figure 2:
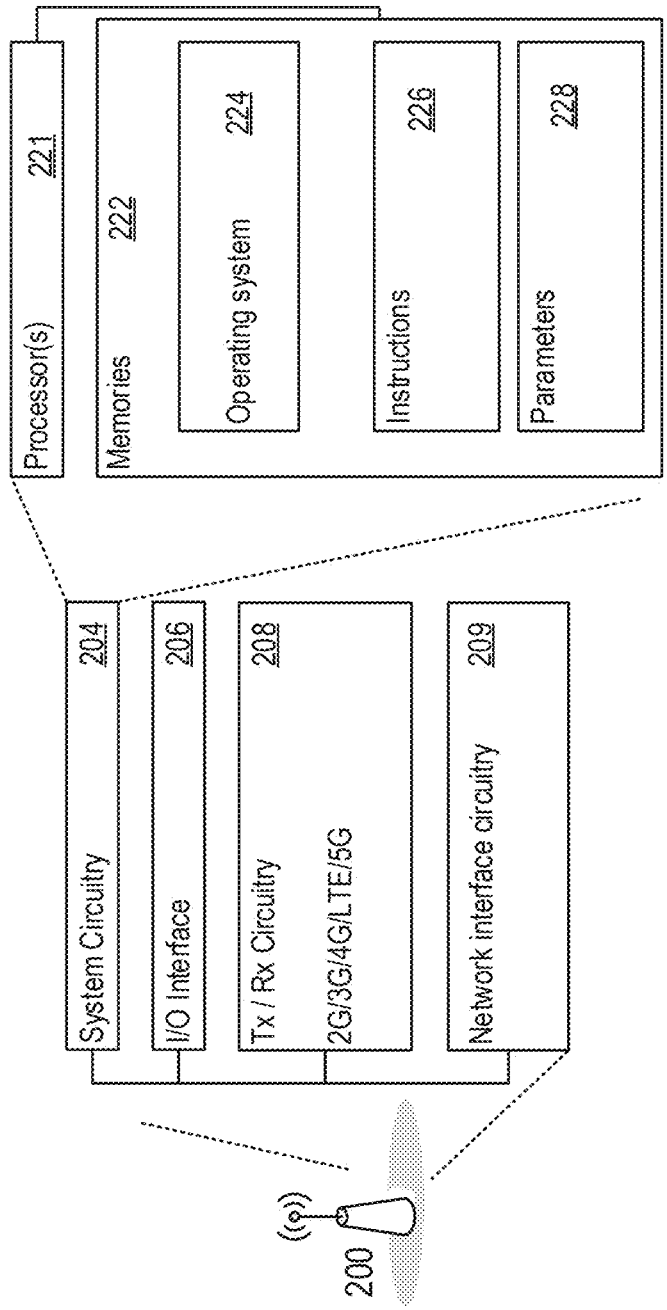
FIG. 2 shows an example of an IAB-donor or IAB-node.

FIG. 2 shows an exemplary wireless communication base station 200. The wireless communication base station 200 may be an exemplary implementation of at least one of the IAB-donors (130 and 135) and/or the IAB-nodes (152, 154, 156, and 158) in FIGS. 1A and 1B. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
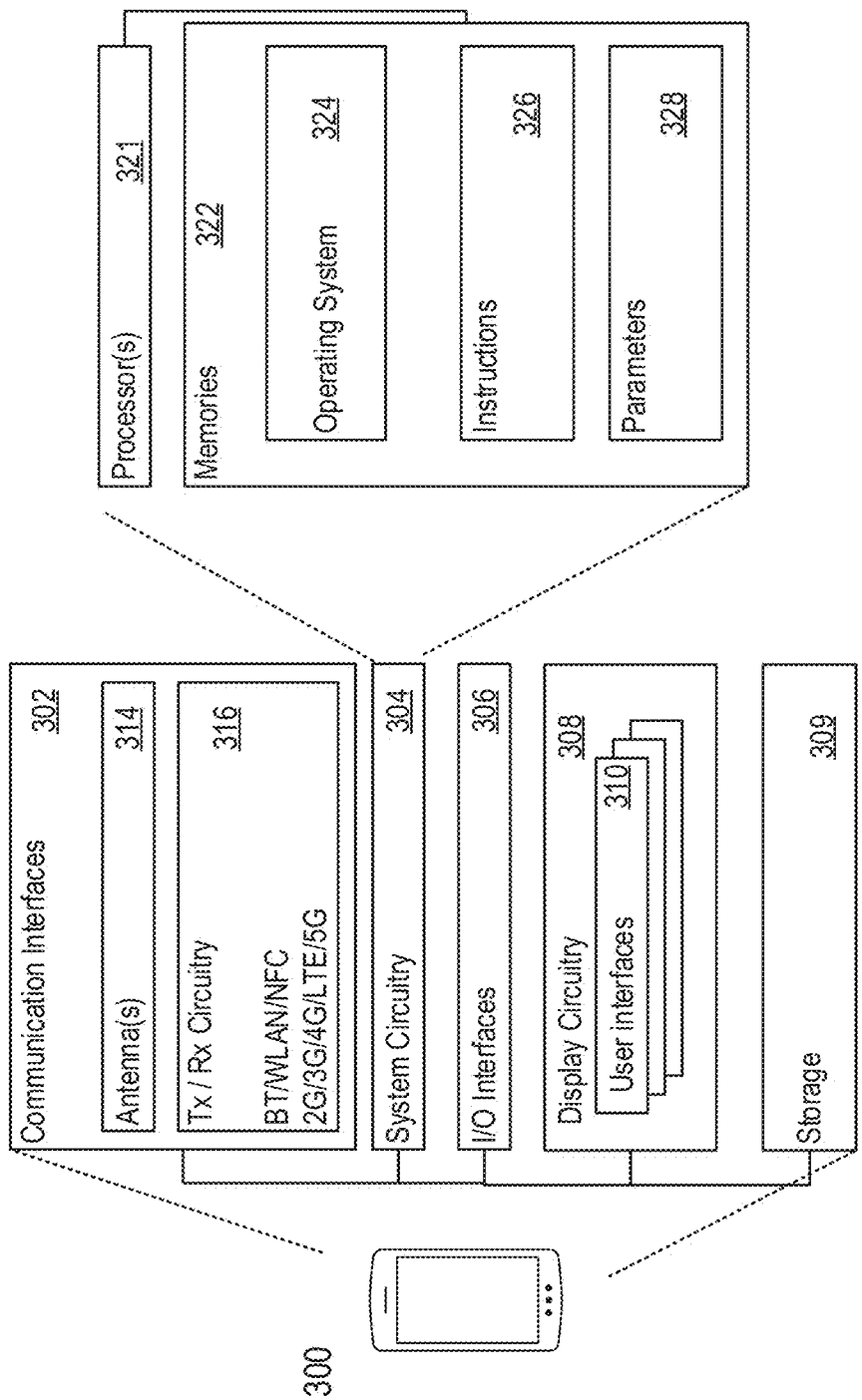
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may be an exemplary implementation of at least one of the UEs (172, 174, and 176) in FIGS. 1A and 1B. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for enhancing mobility robustness of a migrating integrated access and backhaul-node (IAB-node) for new radio (NR), which may be implemented, partly or totally, on one or more wireless network base station and/or one or more user equipment described above in FIGS. 2 and 3.

Referring to FIG. 4, the present disclosure describes an embodiment of a method 400 for enhancing mobility robustness of a migrating IAB-node for NR during migration from a source IAB-donor-central unit (CU) to a target IAB-donor-CU. The method 400 may include step 410: sending, by the source IAB-donor-CU, a handover request message to the target IAB-donor-CU, the handover request message comprising a dual active protocol stack (DAPS) Request Information. In one implementation, the DAPS Request Information is included for a given backhaul (BH) radio link control (RLC) channel of the migrating IAB-node in the HANDOVER REQUEST message. In another implementation, the DAPS Request Information indicates that the source IAB-donor-CU requests a DAPS handover (HO) for a concerned BH RLC channel.

The method 400 may optionally include that, upon the target IAB-donor-CU receiving the handover request message, the target IAB-donor-CU responses the source IAB-donor-CU with a handover request acknowledge message to the source IAB-donor-CU, the handover request acknowledge message comprising a DAPS Response Information. Optionally in one implementation, the DAPS Response Information indicates a response to the requested DAPS Handover (HO) for a given backhaul (BH) radio link control (RLC) channel of the migrating IAB-node.

Referring to FIG. 5, the present disclosure describes an embodiment of a method 500 for enhancing mobility robustness of a migrating integrated access and backhaul-node (IAB-node) for new radio (NR) during migration from a source parent IAB-node to a target parent IAB-node. The method 500 may include step 510: sending, by a central unit (CU) of an IAB-donor (IAB-donor-CU), a F1AP message to the migrating IAB-node, the F1AP message comprising a radio resource control re-configuration (RRCReconfiguration) message comprising a dual active protocol stack (DAPS) configuration information. In one implementation, the DAPS configuration information is included for a given backhaul (BH) radio link control (RLC) channel of the migrating IAB-node.

Optionally in one implementation, the method 500 may include that the IAB-donor-CU send a F1AP message to the migrating IAB-node to indicate the source parent IAB-node to continue sending downlink (DL) data to the migrating IAB-node during the migration.

Optionally in another implementation, the method 500 may include that the IAB-donor-CU sends a F1AP message to an access IAB-node to indicate an access user equipment (UE) to perform uplink data switching by downlink medium access control control element (DL MAC CE). In one implementation, the access IAB-node may be at least one of the migrating IAB-node, and/or a descendant IAB-node of the migrating IAB-node.

Optionally in another implementation, the method 500 may include that the migrating IAB-node modifies a backhaul adaption protocol (BAP) header of uplink forwarding data during the migration.

Figure 6:
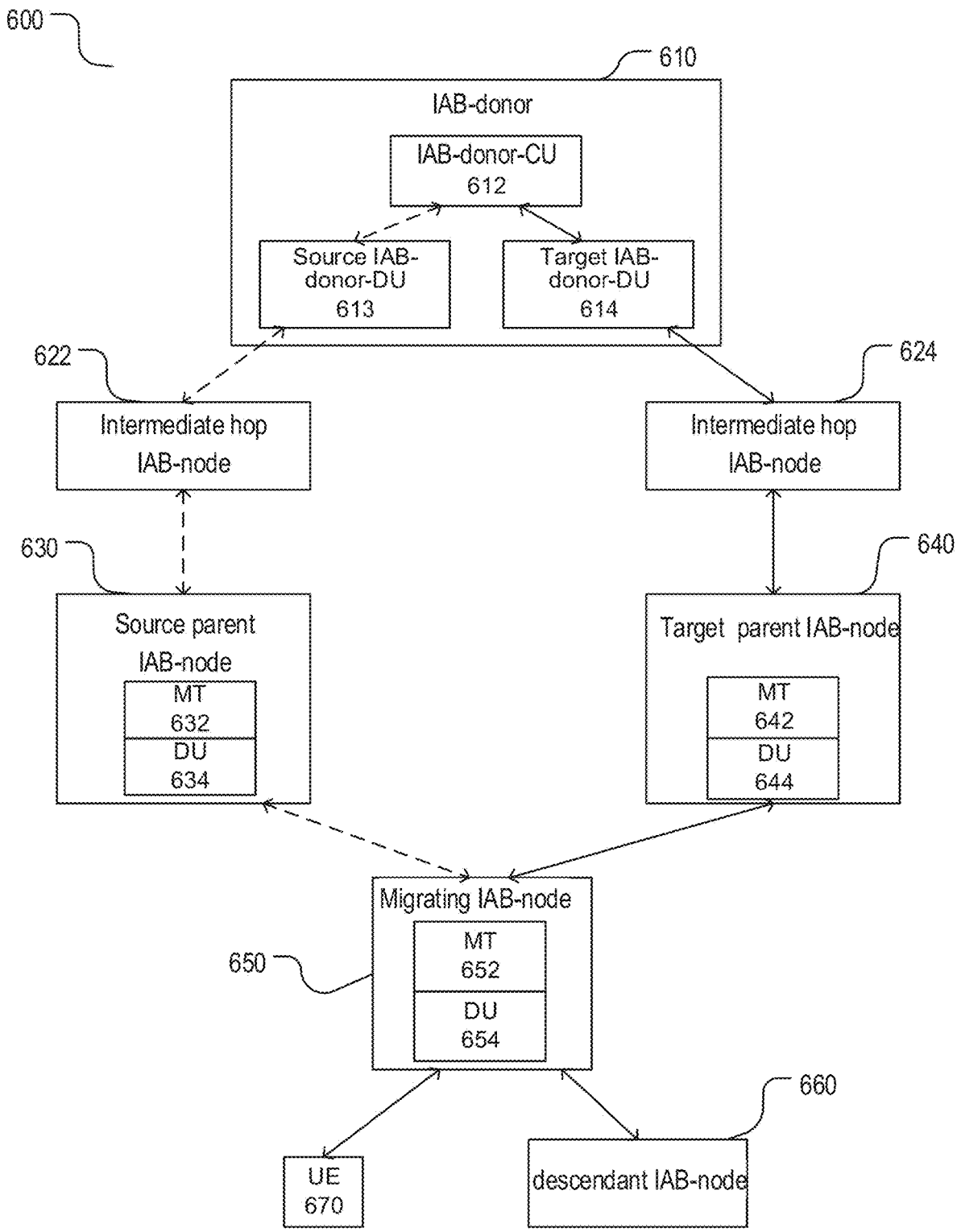
FIG. 6 shows a schematic diagram of a migrating IAB-node in an intra-central unit (CU) migration.

In various embodiments, referring to FIG. 6, an IAB system 600 may include an IAB-donor 610. The IAB-donor 610 may include a central unit (IAB-donor-CU) and one or more distributed unit (IAB-donor-DU). For example but not limited to, in FIG. 6, the IAB-donor 610 may include an IAB-donor-CU 612, a source IAB-donor-DU 613, and a target IAB-donor-DU 614.

An IAB-node 650, which currently connects to the IAB-donor-CU 612 via a source path (dashed line in FIG. 6) including the source IAB-donor-DU 613, may migrate so as to connect to the IAB-donor-CU 612 via a target path including the target IAB-donor-DU 614. The IAB-node 650 may refer to as a migrating IAB-node. In one implementation, the migration in FIG. 6 may optionally refer as intra-CU migration, considering the migration occurs within one IAB-donor-CU.

The source path may additionally include one or more intermediate hop IAB-node 622 on the source path, and/or a source parent IAB-node 630. The source parent IAB-node may include a mobile terminal (MT) 632 and a DU 634.

The target path may additionally include one or more intermediate hop IAB-node 624 on the target path, and/or a target parent IAB-node 640. The target parent IAB-node may include a mobile terminal (MT) 642 and a DU 644.

The migrating IAB-node 650 may include a MT 652 and a DU 654. In one implementation, the migrating IAB-node 650 may connect to one or more user equipment (UE), for example, a UE 670. In another implementation, the migrating IAB-node 650 may connect to one or more descendant IAB-node (UE) or child IAB-node, for example, a descendant IAB-node 660.

Prior to the migration, the migrating IAB-node 650 may be in communication with the source parent IAB-node 630. Referring to FIG. 6, the migrating IAB-node 650 may change its attachment point from the source parent IAB-node 630 connecting to the source IAB-donor-DU 613 to the target parent IAB-node 640 connecting to the target IAB-donor-DU 614. In one implementation, a handover (HO) process may occur during the migration, and this may be an intra-CU HO scenario. The migrating IAB-node DU 454 may communicate with the IAB-donor-CU 612 via F1AP message.

The present disclosure describes various embodiment of methods for maintaining transmission during intra-CU IAB migration with a principle of a dual active protocol stack (DAPS).

Figure 7A:
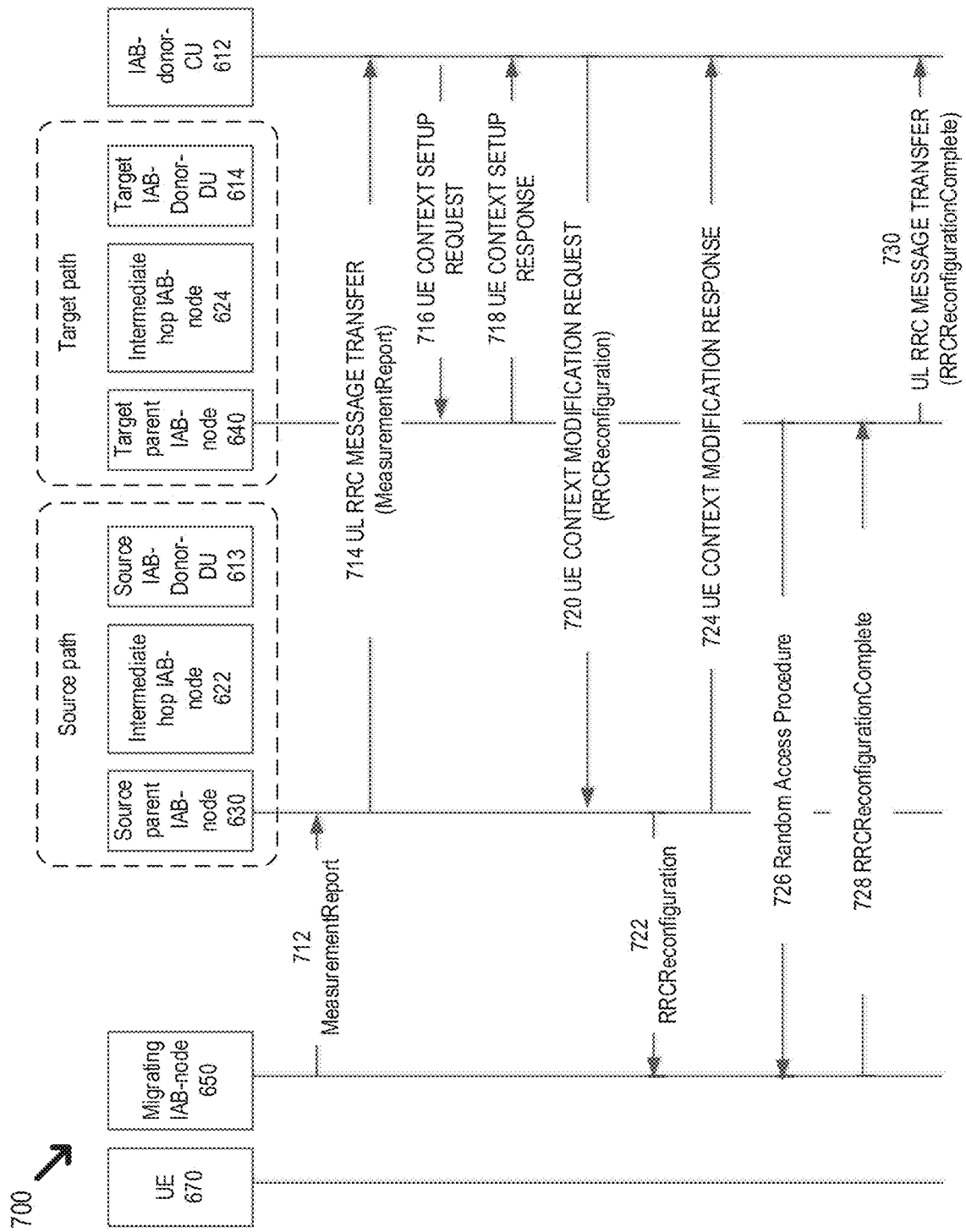
FIG. 7A shows an exemplary logic flow of the method for wireless communication.
Figure 7B:
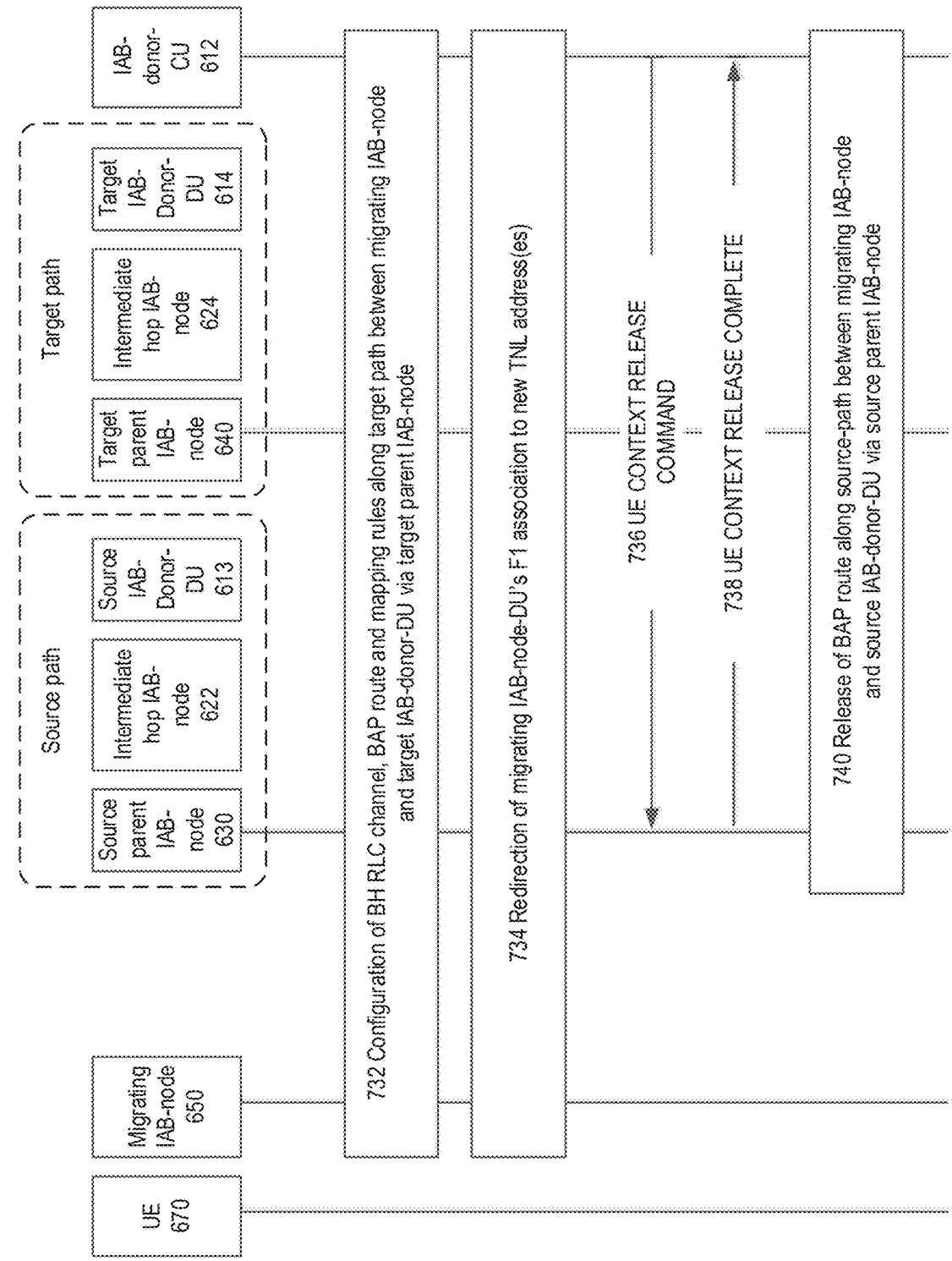
FIG. 7B shows an exemplary logic flow of the method for wireless communication.

FIGS. 7A and 7B show logic flows of a method 700 for enhancing mobility robustness of a migrating IAB-node 650 during migration from a source parent IAB-node 630 to a target parent IAB-node 640. The UE 670 may connect to the migrating IAB-node 650, and migrate together with the migrating IAB-node 650. Before migration, the migrating IAB-node 650 may connect to the IAB-donor-CU 612 via a source path including the source parent IAB-node 630, one or more intermediate hop IAB-node 622, and the source IAB-donor-DU 613. After migration, the migrating IAB-node 650 may connect to the IAB-donor-CU 612 via a target path including the target parent IAB-node 640, one or more intermediate hop IAB-node 624, and the target IAB-donor-DU 614.

In various implementations, the method 700 may optionally include a portion or all of the steps in FIGS. 7A and 7B, and the embodiments described in the present disclosure is examples of the various implementations, not limitations to the various implementations.

Referring to step 712 in FIG. 7A, the migrating IAB-node 650 may send a MeasurementReport message to the source parent IAB-node 630. In one implementation, a MT of the migrating IAB-node may send the MeasurementReport message to a DU of the source parent IAB-node. In another implementation, the MeasurementReport message may be based on a measurement configuration that the migrating IAB-node-MT receives from the IAB-donor-CU 612 previously.

Referring to step 714 in FIG. 7A, the source parent IAB-node 630 may send an UL RRC MESSAGE TRANSFER message to the IAB-donor-CU 612. In one implementation, the DU of the source parent IAB-node may sends the UL RRC MESSAGE TRANSFER message to the IAB-donor-CU 612. In another implementation, the UL RRC MESSAGE TRANSFER message may convey the received MeasurementReport to the IAB-donor-CU.

Referring to step 716 in FIG. 7A, the IAB-donor-CU 612 may send a UE CONTEXT SETUP REQUEST message to the target parent IAB-node 640. In one implementation, the IAB-donor-CU 612 may send the UE CONTEXT SETUP REQUEST message to a DU of the target parent node IAB. In another implementation, the UE CONTEXT SETUP REQUEST message is configured to create the UE context for the migrating IAB-MT and setup one or more bearers. In another implementation, these bearers may be used by the migrating IAB-MT for its own signaling, and, optionally, data traffic.

Referring to step 718 in FIG. 7A, upon receiving the UE CONTEXT SETUP REQUEST message, the DU of the target parent IAB-node 640 may respond to the IAB-donor-CU 612 with a UE CONTEXT SETUP RESPONSE message.

Referring to step 720 in FIG. 7A, the IAB-donor-CU 612 may send a UE CONTEXT MODIFICATION REQUEST message to the DU of the source parent IAB-node 630. In one implementation, the UE CONTEXT MODIFICATION REQUEST message may include a generated RRCReconfiguration message. The RRCReconfiguration message may include a default BH RLC channel and a default BAP Routing ID configuration for UL F1-C traffic mapping on the target path. In another implementation, the RRCReconfiguration message may include additional BH RLC channels.

Optionally, the step 720 may include allocation of one or more transport network layer (TNL) address, which may be routable via the target IAB-donor-DU. The new one or more TNL address may be included in the RRCReconfiguration message as a replacement for the one or more TNL address that is routable via the source IAB-donor-DU. In one implementation, in case IPsec tunnel mode is used to protect the F1 and non-F1 traffic, the allocated TNL address is outer IP address. The TNL address replacement is not necessary if the source and target paths use the same IAB-donor-DU.

Optionally, the RRCReconfiguration message may include DAPS-configuration for one or more BH RLC channel between the MT of the migrating IAB-node 650 and the DU of the target parent IAB-node 640 as well as the DAPS-configuration for one or more dedicated radio bearer (DRB) of one or more UE 670 connecting to the migrating IAB-node 650.

Optionally, the UE CONTEXT MODIFICATION REQUEST message may include a Transmission Action Indicator, which indicates to not stop the data transmission to the migrating IAB-node.

Referring to step 722 in FIG. 7A, the DU of the source parent IAB-node 630 may forward the received RRCReconfiguration message to the MT of the migrating IAB-node 650.

Referring to step 724 in FIG. 7A, the DU of the source parent IAB-node 630 may respond to the IAB-donor-CU 612 with a UE CONTEXT MODIFICATION RESPONSE message.

Referring to step 726 in FIG. 7A, a random access procedure may be performed at the DU of the target parent IAB-node 640 to the migrating IAB-node 650.

Referring to step 728 in FIG. 7A, the MT of the migrating IAB-node 650 may respond to the DU of the target parent IAB-node 640 with an RRCReconfigurationComplete message.

Referring to step 730 in FIG. 7A, the DU of the target parent IAB-node 640 may send an UL RRC MESSAGE TRANSFER message to the IAB-donor-CU 612 to convey the received RRCReconfigurationComplete message.

Optionally, the step 730 may include that uplink (UL) packets may be sent from the MT of the migrating IAB-node 650, and are forwarded to the IAB-donor-CU 612 through the DU of the target parent IAB-node 640. In one implementation, the UL packets may belong to the signaling of the MT of the migrating IAB-node 650 and, optionally, data traffic.

Referring to step 732 in FIG. 7B, the IAB-donor-CU may configure the one or more BH RLC channel and one or more BAP-sublayer routing entry on the target path between the target parent IAB-node 640 and the target IAB-donor-DU 614 as well as one or more downlink (DL) mapping on the target IAB-donor-DU 614 for the migrating IAB-node's target path. In one implementation, optionally, the above configuration may be performed at an earlier stage, e.g., immediately after step 716. In another implementation, the IAB-donor-CU 612 may establish one or more additional BH RLC channel to the MT of the migrating IAB-node 650 via a RRC message.

Referring to step 734 in FIG. 7B, the F1-C connections may be switched to use the migrating IAB-node's one or more new TNL address. The IAB-donor-CU 612 may update the BH information associated to each GTP-tunnel to the migrating IAB-node 650. Optionally, the step 734 may also update UL FTEID and DL FTEID associated to each GTP-tunnel. In one implementation, all F1-U tunnels may be switched to use the migrating IAB-node's one or more new TNL address. In another implementation, this step may use non-UE associated signaling in E1 and/or F1 interface to provide updated UP configuration for F1-U tunnels of one or more connected UEs or child or descendent IAB-nodes.

Optionally, in step 734, the IAB-donor-CU 612 may update the UL BH information associated with Non-UP traffic. Optionally in another implementation, uplink retransmission packets for one or more DAPS-configuration DRB and/or BH RLC channel may be sent from the MT of the migrating IAB-node 650, which may be forwarded to the IAB-donor-CU 612 through the DU of the target parent IAB-node 640. Optionally in another implementation, the migrating IAB-node 650 may modify the uplink retransmission packets' BAP header.

Referring to step 736 in FIG. 7B, the IAB-donor-CU 612 may send a UE CONTEXT RELEASE COMMAND message to the DU of the source parent IAB-node 630.

Referring to step 738 in FIG. 7B, the DU of the source parent IAB-node 630 may release context of the MT of the migrating IAB-node 650 and respond to the IAB-donor-CU 612 with a UE CONTEXT RELEASE COMPLETE message.

Referring to step 740 in FIG. 7B, the IAB-donor-CU 612 may release the one or more BH RLC channel and one or more BAP-sublayer routing entry on the source path between the source parent IAB-node 630 and the source IAB-donor-DU 613.

Figure 8:
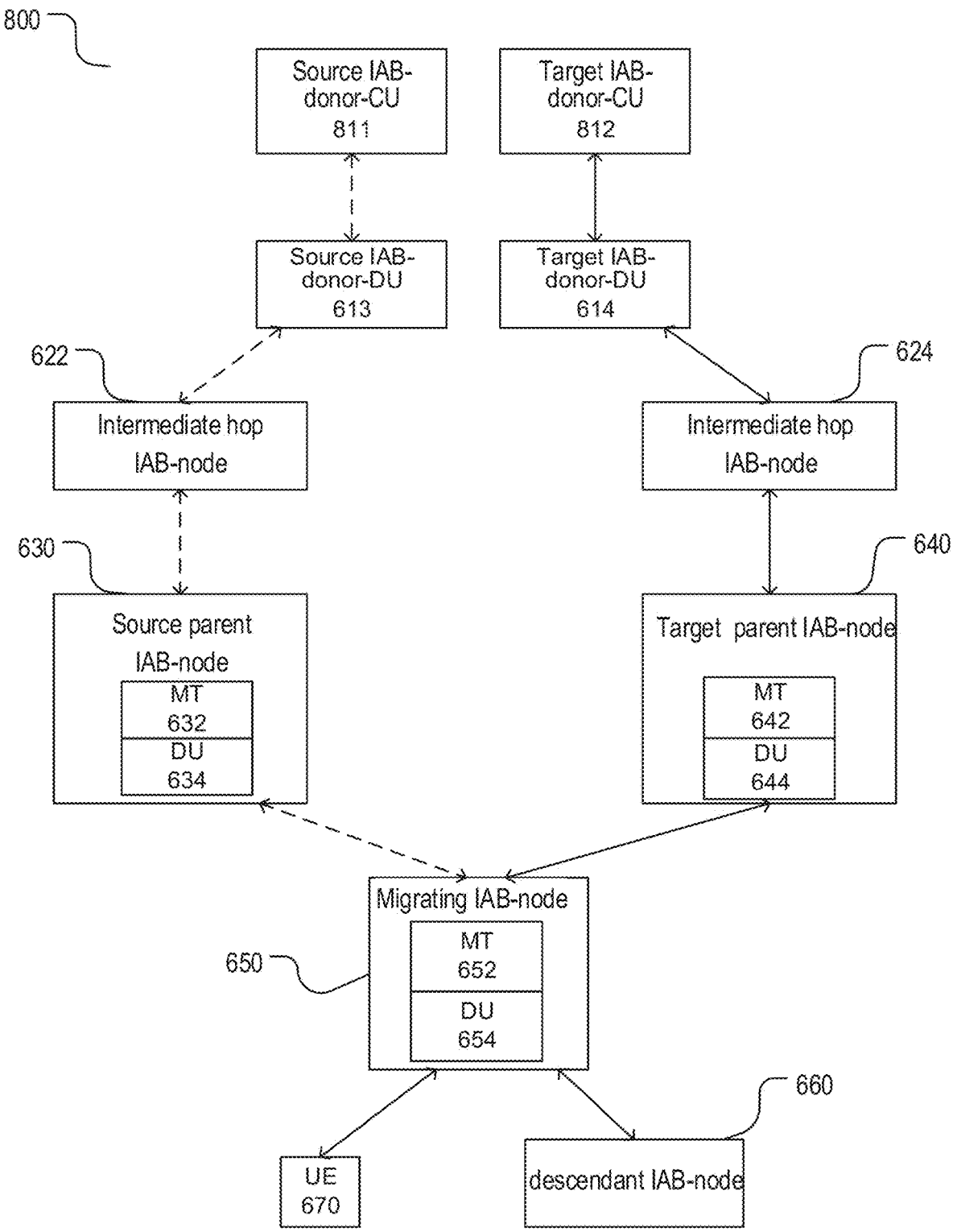
FIG. 8 shows a schematic diagram of a migrating IAB-node in an inter-CU migration.

In various embodiments, referring to FIG. 8, an IAB system 800 may include a source IAB-donor-CU 811 and a target IAB-donor-CU 812. The migrating IAB-node 650, which currently connects to the source IAB-donor-CU 811 via a source path (dashed line in FIG. 8) including the source IAB-donor-DU 613, may migrate so as to connect to the target IAB-donor-CU 812 via a target path including the target IAB-donor-DU 614. In one implementation, the migration in FIG. 8 may optionally refer as inter-CU migration, considering the migration occurs between more than one IAB-donor-CU, for example, migration from the source IAB-donor-CU 811 to the target IAB-donor-CU 812.

Prior to the migration, the migrating IAB-node 650 may be in communication with the source parent IAB-node 630. Referring to FIG. 8, the migrating IAB-node 650 may change its attachment point from the source parent IAB-node 630 connecting to the source IAB-donor-CU 811 to the target parent IAB-node 640 connecting to the target IAB-donor-CU 812. In one implementation, a handover (HO) process may occur during the migration, and this may be an inter-CU HO scenario. The migrating IAB-node DU 454 may communicate with the source IAB-donor-CU 811 and/or the target IAB-donor-CU 812 via F1AP message.

The present disclosure describes various embodiment of methods for maintaining transmission during inter-CU IAB migration with a principle of a dual active protocol stack (DAPS).

Figure 9A:
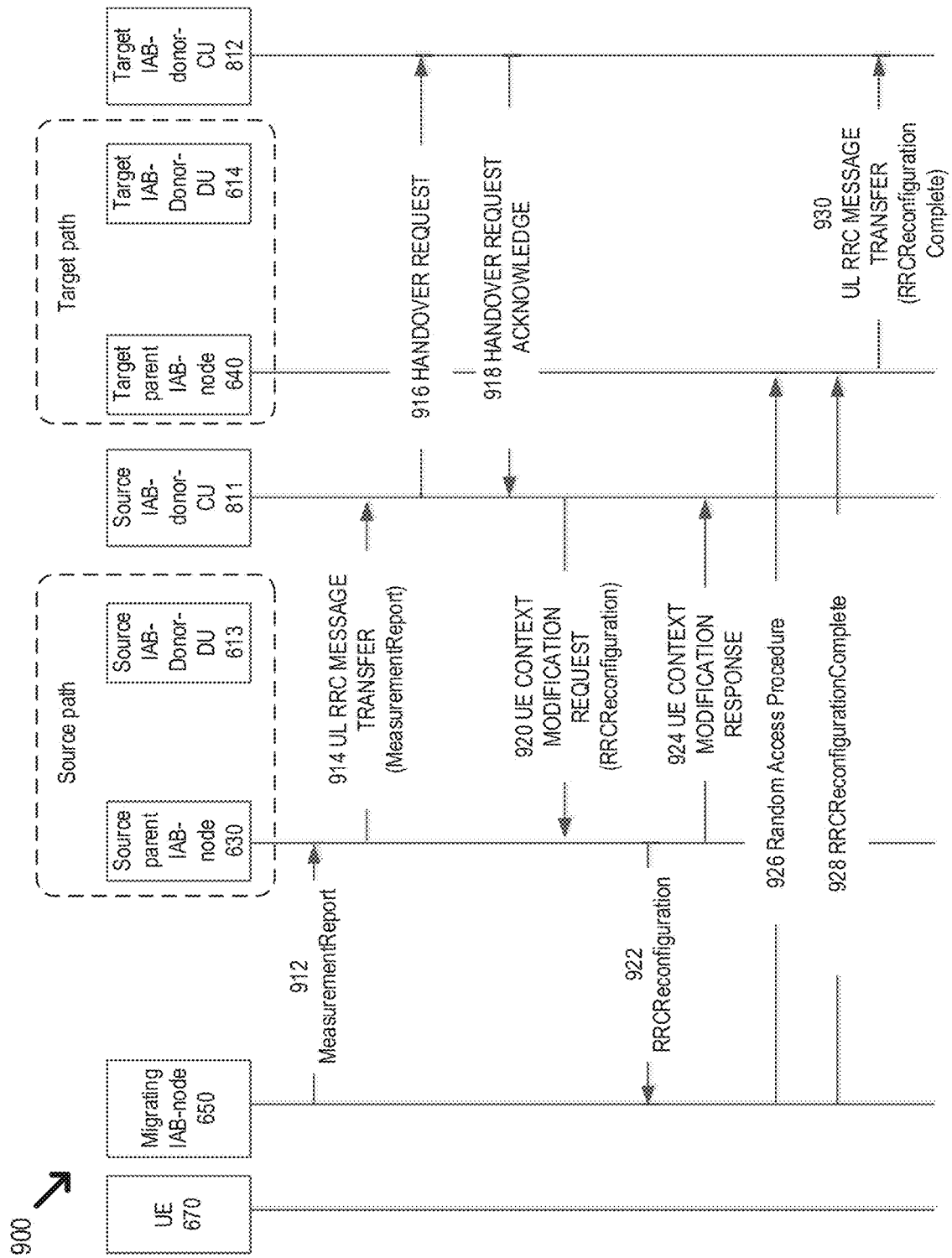
FIG. 9A shows an exemplary logic flow of the method for wireless communication.
Figure 9B:
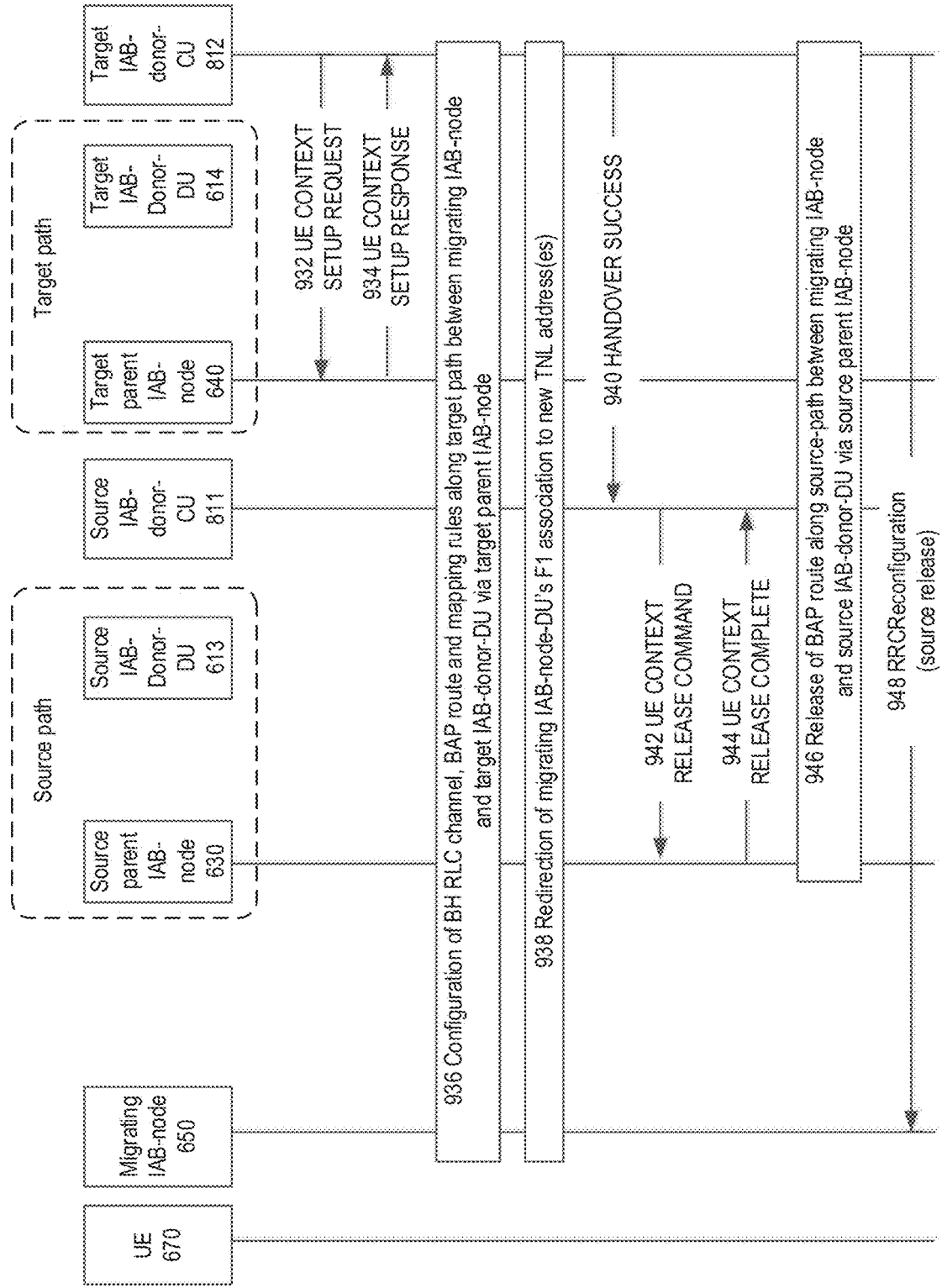
FIG. 9B shows an exemplary logic flow of the method for wireless communication.

FIGS. 9A and 9B show logic flows of a method 900 for enhancing mobility robustness of a migrating IAB-node 650 during migration from the source IAB-donor-CU 811 to the target IAB-donor-CU 812. The UE 670 and/or any child/descendent IAB-node may connect to the migrating IAB-node 650, and migrate together with the migrating IAB-node 650. Before migration, the migrating IAB-node 650 may connect to the source IAB-donor-CU 811 via a source path including the source parent IAB-node 630 and the source IAB-donor-DU 613. After migration, the migrating IAB-node 650 may connect to the target IAB-donor-CU 812 via a target path including the target parent IAB-node 640 and the target IAB-donor-DU 614.

In various implementations, the method 900 may optionally include a portion or all of the steps in FIGS. 9A and 9B, and the embodiments described in the present disclosure is examples of the various implementations, not limitations to the various implementations.

Referring to step 912 in FIG. 9A, a MT of the migrating IAB-node 650 may send a MeasurementReport message to a DU of the source parent IAB-node 630. In one implementation, The MeasurementReport message may be based on a measurement configuration the migrating IAB-node receives from the source IAB-donor-CU 811 previously.

Referring to step 914 in FIG. 9A, the DU of the source parent IAB-node 630 may send an UL RRC MESSAGE TRANSFER message to the source IAB-donor-CU 811 to convey the received MeasurementReport.

Referring to step 916 in FIG. 9A, the source IAB-donor-CU 811 may send a HANDOVER REQUEST message to the target IAB-donor-CU 812 with necessary information to prepare the handover at the target side. Optionally in one implementation, the HANDOVER REQUEST message may indicate a DAPS HO request for the concerned DRB or concerned BH RLC channel.

Referring to step 918 in FIG. 9A, the target IAB-donor-CU 812 may perform admission control and respond the source IAB-donor-CU 811 with a HANDOVER REQUEST ACKNOWLEDGE message. Optionally in one implementation, the HANDOVER REQUEST ACKNOWLEDGE message may include the information required to access the target side. Optionally in another implementation, the HANDOVER REQUEST ACKNOWLEDGE message may indicate a DAPS HO response for the concerned DRB or concerned BH RLC channel.

Referring to step 920 in FIG. 9A, the source IAB-donor-CU 811 may send a UE CONTEXT MODIFICATION REQUEST message to the DU of the source parent IAB-node 630. In one implementation, the UE CONTEXT MODIFICATION REQUEST message may include a generated RRCReconfiguration message.

Optionally in another implementation, the RRCReconfiguration message may include a default BH RLC channel and a default backhaul adaption protocol (BAP) routing identification (ID) configuration for UL F1-C traffic mapping on the target path. Optionally in another implementation, the RRCReconfiguration message may include one or more additional BH RLC channel.

Optionally in another implementation, the step 920 may include allocation of one or more TNL address that is routable via the target IAB-donor-DU 614. Optionally in another implementation, the RRCReconfiguration message may include one or more new TNL address as replacement for the one or more TNL address that is routable via the source IAB-donor-DU.

Optionally in another implementation, in case IPsec tunnel mode is used to protect the F1 and non-F1 traffic, the allocated TNL address is outer IP address. The TNL address replacement is not necessary if the source and target paths use the same IAB-donor-DU.

Optionally in another implementation, the RRCReconfiguration message may include DAPS-HO indication for the concerned BH RLC channel between the MT and the migrating IAB-node and the target parent IAB-DU as well as the DAPS-HO indication for the concerned DRBs of the UE connecting to the migrating IAB-node.

Optionally in another implementation, the UE CONTEXT MODIFICATION REQUEST message may include a transmission action indicator, which indicates to not stop the data transmission to the migrating IAB-node.

Referring to step 922 in FIG. 9A, the DU of the source parent IAB-node 630 may forward the received RRCReconfiguration message to the MT of the migrating IAB-node 650.

Referring to step 924 in FIG. 9A, the DU of the source parent IAB-node 630 may respond to the source IAB-donor-CU 811 with the UE CONTEXT MODIFICATION RESPONSE message.

Referring to step 926 in FIG. 9A, a random access procedure may be performed at the DU of the target parent IAB-node 640.

Referring to step 928 in FIG. 9A, the MT of the migrating IAB-node 650 may respond to the DU of the target parent IAB-node 640 with an RRCReconfigurationComplete message.

Referring to step 930 in FIG. 9A, the DU of the target parent IAB-node may send an UL RRC MESSAGE TRANSFER message to the target IAB-donor-CU 812 to convey the received RRCReconfigurationComplete message. Optionally in another implementation, uplink packets may be sent from the migrating IAB-MT, which are forwarded to the target IAB-donor-CU 812 through the DU of the target parent IAB-node 640. Optionally in another implementation, the UL packets belong to the IAB-MT's own signaling and, optionally, data traffic.

Referring to step 932 in FIG. 9B, the target IAB-donor-CU 812 may send a UE CONTEXT SETUP REQUEST message to the DU of the target parent IAB-node 640 to create the UE context for the migrating IAB-node and setup one or more bearer. In one implementation, the one or more bearer may be used by the migrating IAB-node 650 for its own signaling, and, optionally, data traffic.

Referring to step 934 in FIG. 9B, the DU of the target parent IAB-node 640 may respond to the target IAB-donor-CU 812 with a UE CONTEXT SETUP RESPONSE message.

Referring to step 936 in FIG. 9B, the target IAB-donor-CU 812 may configure one or more BH RLC channel and one or more BAP-sublayer routing entry on the target path between the target parent IAB-node 640 and target IAB-donor-DU 614 as well as DL mappings on the target IAB-donor-DU 614 for the migrating IAB-node's target path. Optionally in one implementation, the configuration may be performed at an earlier stage, e.g., immediately after step 916. Optionally in another implementation, the target IAB-donor-CU 812 may establish one or more additional BH RLC channel to the migrating IAB-node via RRC message.

Referring to step 938 in FIG. 9B, the F1-C connections may be switched to use the migrating IAB-node's new one or more TNL address. Optionally in one implementation, the target IAB-donor-CU 812 may update the BH information associated to each GTP-tunnel to the migrating IAB-node 650.

Optionally in another implementation, the step 938 may also include updating UL FTEID and DL FTEID associated to each GTP-tunnel. Optionally in another implementation, all F1-U tunnels may be switched to use the migrating IAB-node's new one or more TNL address. Optionally in another implementation, the step 938 may include using non-UE associated signaling in E1 and/or F1 interface to provide updated UP configuration for F1-U tunnels of multiple connected UEs or child IAB-MTs.

Optionally in another implementation, the target IAB-donor-CU 812 may update the UL BH information associated with Non-UP traffic. Optionally in another implementation, the IAB-donor-CU sends a F1AP message to the access IAB-node to indicate its access UE to perform uplink data switching by DL MAC CE. After receiving the DL MAC CE, the UE performs uplink data switching procedure. Uplink retransmission packets for one or more DAPS-HO DRB and one or more BH RLC channel may be sent from the MT of the migrating IAB-node 650, which are forwarded to the target IAB-donor-CU 812 through the DU of the target parent IAB-node 640.

Optionally in another implementation, the migrating IAB-node 650 may modify the uplink retransmission packets' BAP header.

Referring to step 940 in FIG. 9B, the target IAB-donor-CU 812 may send a Handover success message to the source IAB-donor-CU 811.

Referring to step 942 in FIG. 9B, the source IAB-donor-CU 811 may send a UE CONTEXT RELEASE COMMAND message to the DU of the source parent IAB-node 630.

Referring to step 944 in FIG. 9B, the DU of the source parent IAB-node 630 may release the migrating IAB-MT's context and responds to the source IAB-donor-CU 811 with a UE CONTEXT RELEASE COMPLETE message.

Referring to step 946 in FIG. 9B, the source IAB-donor-CU 811 may release one or more BH RLC channel and one or more BAP-sublayer routing entry on the source path between the source parent IAB-node 630 and the source IAB-donor-DU 613.

Referring to step 948 in FIG. 9B, the target IAB-donor-CU 812 may send a RRCReconfiguration message to the MT of the migrating IAB-node 650. In one implementation, the RRCReconfiguration message may include the DAPS-HO release indication. Optionally in another implementation, the MT of the migrating IAB-node 650 may release the connection with the source parent IAB-node 630.

The present disclosure describes methods, apparatus, and computer-readable medium for wireless communication. The present disclosure addressed the issues with enhancing mobility robustness of a migrating integrated access and backhaul-node (IAB-node) for new radio (NR) during inter-CU or intra-CU migration. The methods, devices, and computer-readable medium described in the present disclosure may facilitate the performance of wireless communication by sending a handover request message comprising a dual active protocol stack (DAPS) configuration request, thus improving migration efficiency and overall wireless network performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
enhancing mobility robustness of a migrating integrated access and backhaul-node (IAB-node) for new radio (NR) during migration from a source IAB-donor-central unit (CU) to a target IAB-donor-CU by:
sending, by the source IAB-donor-CU, a handover request message to the target IAB-donor-CU, the handover request message comprising a dual active protocol stack (DAPS) Request Information,
wherein the DAPS Request Information is included for a given backhaul (BH) radio link control (RLC) channel of the migrating IAB-node in the handover request message.

2. The method according to claim 1, wherein:
the DAPS Request Information indicates that the source IAB-donor-CU requests a DAPS handover (HO) for a concerned BH RLC channel.

3. The method according to claim 1, wherein:
upon the target IAB-donor-CU receiving the handover request message, the target IAB-donor-CU responses the source IAB-donor-CU with a handover request acknowledge message to the source IAB-donor-CU, the handover request acknowledge message comprising a DAPS Response Information.

4. The method according to claim 2, wherein:
the DAPS Response Information indicates a response to the requested DAPS Handover (HO) for a given backhaul (BH) radio link control (RLC) channel of the migrating IAB-node.

5. A method for wireless communication, comprising:
enhancing mobility robustness of a migrating integrated access and backhaul-node (IAB-node) for new radio (NR) during migration from a source parent IAB-node to a target parent IAB-node by:
sending, by a central unit (CU) of an IAB-donor (IAB-donor-CU), a F1AP message to the migrating IAB-node, the F1AP message comprising a radio resource control re-configuration (RRCReconfiguration) message comprising a DAPS configuration information,
wherein the DAPS configuration information is included for a given backhaul (BH) radio link control (RLC) channel of the migrating IAB-node.

6. The method according to claim 5, wherein:
the IAB-donor-CU sends a F1AP message to the migrating IAB-node to indicate the source parent IAB-node to continue sending downlink (DL) data to the migrating IAB-node during the migration.

7. The method according to claim 5, wherein:
the IAB-donor-CU sends a F1AP message to an access IAB-node to indicate an access user equipment (UE) to perform uplink data switching by downlink medium access control control element (DL MAC CE).

8. The method according to claim 7, wherein:
the access IAB-node comprises at least one of:
the migrating IAB-node, or
a descendant IAB-node of the migrating IAB-node.

9. The method according to claim 5, wherein:
the migrating IAB-node modifies a backhaul adaption protocol (BAP) header of uplink forwarding data during the migration.

10. An apparatus comprising:
a memory storing instructions; and
a processor in communication with the memory, wherein, when the processor executes the instructions, the processor is configured to cause the apparatus to perform:
enhancing mobility robustness of a migrating integrated access and backhaul-node (IAB-node) for new radio (NR) during migration from the apparatus to a target IAB-donor-CU by:
sending a handover request message to the target IAB-donor-CU, the handover request message comprising a dual active protocol stack (DAPS) Request Information,
wherein the DAPS Request Information is included for a given backhaul (BH) radio link control (RLC) channel of the migrating IAB-node in the handover request message.

11. The apparatus according to claim 10, wherein:
the DAPS Request Information indicates that the apparatus requests a DAPS handover (HO) for a concerned BH RLC channel.

12. The apparatus according to claim 10, wherein:
upon the target IAB-donor-CU receiving the handover request message, the target IAB-donor-CU responses the apparatus with a handover request acknowledge message to the apparatus, the handover request acknowledge message comprising a DAPS Response Information.

13. The apparatus according to claim 11, wherein:
the DAPS Response Information indicates a response to the requested DAPS Handover (HO) for a given backhaul (BH) radio link control (RLC) channel of the migrating IAB-node.

14. An apparatus comprising:
a memory storing instructions; and
a processor in communication with the memory, wherein, when the processor executes the instructions, the processor is configured to cause the apparatus to perform:
enhancing mobility robustness of a migrating integrated access and backhaul-node (IAB-node) for new radio (NR) during migration from a source parent IAB-node to a target parent IAB-node by:
sending, by the apparatus, a F1AP message to the migrating IAB-node, the F1AP message comprising a radio resource control re-configuration (RRCReconfiguration) message comprising a DAPS configuration information
wherein the DAPS configuration information is included for a given backhaul (BH) radio link control (RLC) channel of the migrating IAB-node.

15. The apparatus according to claim 14, wherein:
the apparatus sends a F1AP message to the migrating IAB-node to indicate the source parent IAB-node to continue sending downlink (DL) data to the migrating IAB-node during the migration.

16. The apparatus according to claim 14, wherein:
the apparatus sends a F1AP message to an access IAB-node to indicate an access user equipment (UE) to perform uplink data switching by downlink medium access control control element (DL MAC CE).

17. The apparatus according to claim 16, wherein:
the access IAB-node comprises at least one of:
the migrating IAB-node, or
a descendant IAB-node of the migrating IAB-node.

18. The apparatus according to claim 14, wherein:
the migrating IAB-node modifies a backhaul adaption protocol (BAP) header of uplink forwarding data during the migration.

* * * * *